United States Patent [19]

Takehara

[11] Patent Number: 4,637,584
[45] Date of Patent: Jan. 20, 1987

[54] POWER UNIT MOUNT ASSEMBLY
[75] Inventor: Shin Takehara, Machida, Japan
[73] Assignee: Nissan Motor Co., Ltd., Yokohama, Japan
[21] Appl. No.: 722,713
[22] Filed: Apr. 11, 1985
[30] Foreign Application Priority Data
  Apr. 11, 1984 [JP] Japan ................... 59-71005
[51] Int. Cl.⁴ .............................. F16M 13/00
[52] U.S. Cl. ..................... 248/559; 180/300; 248/638; 248/659; 267/140.1
[58] Field of Search .............. 248/559, 550, 659, 636, 248/562, 563, 638; 267/140.1, 80, 141.2, 141.3, 41.4, 141.5, 127; 180/300; 188/298, 282, 317, 322.15, 379

[56] References Cited
U.S. PATENT DOCUMENTS
4,415,148 11/1983 Mair et al. ............... 267/140.1
4,418,895 12/1983 Bertin et al. ............. 267/140.1
4,428,567 1/1984 Takei .................... 248/562 X
4,432,537 2/1984 Pletsch .................. 267/140.1 X
4,483,521 11/1984 Kakimoto ................ 267/140.1 X
4,505,461 3/1985 Kakimoto ................ 267/140.1
4,535,976 8/1985 Dan ..................... 267/8 R FOREIGN PATENT DOCUMENTS
2652501 5/1978 Fed. Rep. of Germany ... 267/140.1
3125040 3/1983 Fed. Rep. of Germany ...... 248/559

Primary Examiner—J. Franklin Foss
Attorney, Agent, or Firm—Schwartz, Jeffery, Schwaab, Mack, Blumenthal & Evans

[57] ABSTRACT

A fluid-containing power unit mount device in which an elastic member is secured between a power unit side base plate and a vehicle body side base plate to form an inner space. A fluid is enclosed in the inner space, forming a fluid chamber. An aperture is provided in one of the base plates, and this aperture is blocked by an elastic member on which is mounted a mass body.

11 Claims, 3 Drawing Figures

POWER UNIT MOUNT ASSEMBLY

BACKGROUND OF THE INVENTION

1. Field of the Invention

The present invention relates to a power unit mount assembly.

2. Description of the Related Art

One power unit mount device equipped with a dynamic damper is disclosed in Japanese Utility Model Publication of Unexamined Application No. 58-44222. This mount device comprises annular external and internal cylindrical bodies with a resilient material such as rubber inserted between these two bodies. The external cylindrical body is mounted on the power unit through a bracket. The internal cylindrical body is mounted on the vehicle body. A projection is provided on the external circumferential surface of the external cylindrical body, at a location opposite the bracket. In this projection, a mass member is installed so that an elastic member is positioned between the projection and the mass member. That is, the mass member is resiliently supported by the external cylindrical body at a portion remote from the bracket, and functions as dynamic damper.

In this type of fabrication, the power unit is resiliently supported on the vehicle body while at the same time receiving the action of the mass member as a dynamic damper. As a result, it is possible to shift from the resonant frequency of the mount device of 200 to 400 Hz to a frequency band where the problem of the vibrational sound entering the vehicle body does not occur.

In this type of conventional mount device, because the mass member is resiliently supported on the external cylindrical body to avoid resonance at a specific frequency, the resonant frequency, fo, obtained by the formula $$fo = \frac{1}{2\pi} \sqrt{\frac{k}{m}}$$

is reduced to the low frequency side through the reduction of the k value or the increase of the m value, so that there is a restraint on the set degrees of freedom of the resonant frequency, fo. For example, it is essentially impossible to set a resonance point in the low frequency range of 6 to 50 Hz, and the problem exists that this type of conventional mounting device cannot be applied to the vibration damping of engine shake, etc.

SUMMARY OF THE INVENTION

An object of the present invention is to provide, with due consideration to the drawbacks of such conventional devices, a solution to the above-mentioned problems by the provision of a fluid-containing power unit mount assembly in which base plates are provided on the power unit side and on the vehicle body side to define a fluid chamber together with a resilient member therebetween such that the set degrees of freedom at the resonant frequency are increased.

Another object of the present invention is to provide a fluid-containing power unit mount device in which the number of degrees of freedom of the resonant frequency of the mass body, which functions as a dynamic damper, are increased, and in which the damping capacity easily conforms to the required frequency.

Briefly described, these and other objects of the present invention are accomplished by the provision of a fluid-containing power unit mount device in which an elastic member is secured between a power unit side base plate and a vehicle body side base plate to define an inner space therein. A fluid is enclosed in the inner space, forming a fluid chamber. An aperture is provided in one of the base plates which define the fluid chamber together with the mount rubber, and this aperture is blocked by an elastic member on which is mounted a mass body.

BRIEF DESCRIPTION OF THE DRAWINGS

These and other objects, features and advantages of the present invention will become more apparent from the following description of a preferred embodiment taken in conjunction with the accompanying drawings, in which.

DESCRIPTION OF PREFERRED EMBODIMENTS

Following is a description of preferred embodiments of the present invention, with reference to the drawings.

Figure 1:
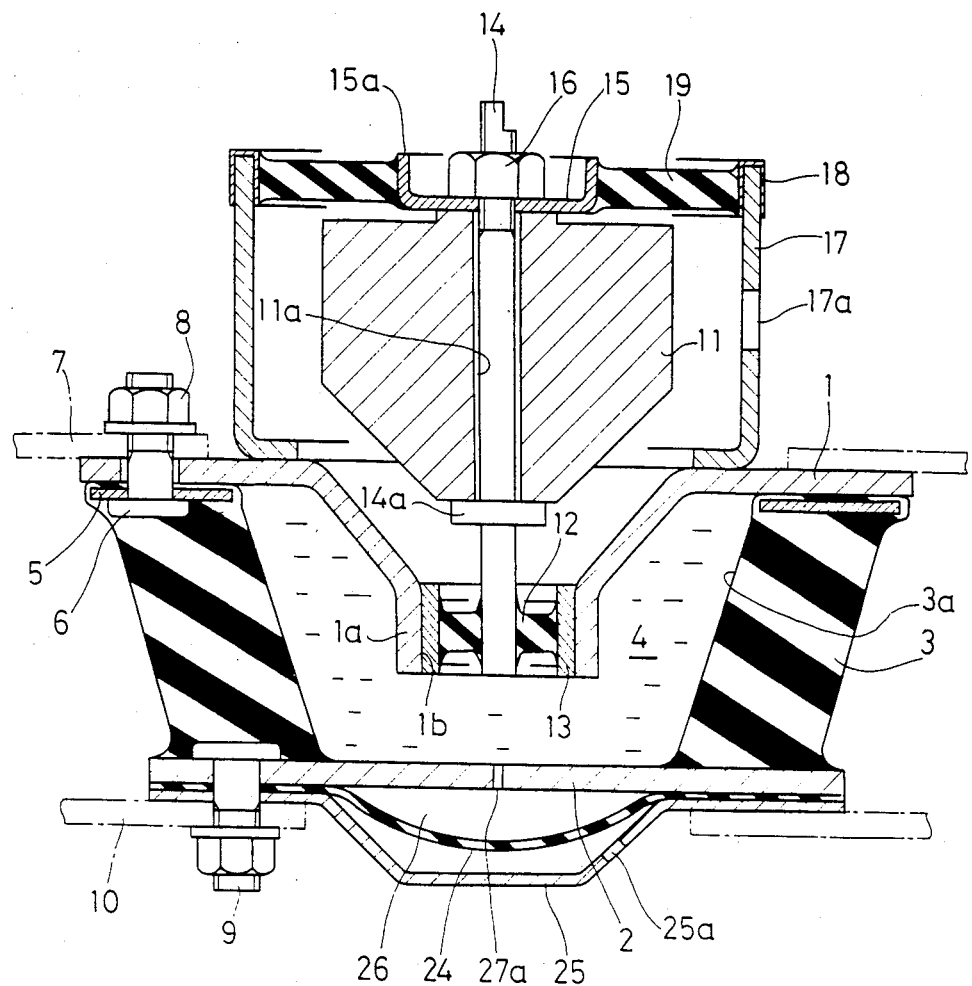
FIG. 1 is a cross sectional view illustrating a first embodiment of the present invention.

In FIG. 1, illustrating a first embodiment of the present invention, there is provided a fluid chamber defined by a first base plate 1 formed on the power unit side and a second base plate 2 formed on the vehicle body side and a mount rubber or elastic member 3 secured between the first and second base plates such that the first base plate 1, the second base plate 2, and the mount rubber 3 define an internal space 3a for the fluid chamber. An unpressured fluid such as water or oil is enclosed in space 3a, which forms a first fluid chamber 4. Specifically, one end surface of the mount rubber 3 is connected through a vulcanizing bonding process to the second base plate on the vehicle body, while a metal ring 5 and a bolt 6 are buried in the other end. The bolt 6 is inserted through the base plate 1 and the power unit 7. The other end of the mount rubber 3 is caused to adhere tightly to the first base plate 1 by the tightening of a nut 8. A bolt 9 is buried in the mount rubber 3 to mount the second base plate 2 to the vehicle body 10.

The center section of the first base plate 1 is of frustum configuration with a gradually reducing diameter to project into the first fluid chamber 4. A short tubular section 1a is formed on the leading end of this frustum, and is provided with an aperture 1b.

The aperture 1b is blocked by an elastic member 12, that is an elastic membrane 12 in this embodiment, on which is mounted a mass body 11, and provides approximately the same action as a dynamic damper. That is, a tubular member 13 is pressed into the short tubular section 1a, and the elastic membrane 12 formed of rubber or elastomer is bonded through vulcanizing between the inner circumferential surface of the tubular member 13 and the outer circumferential surface of a support shaft 14. The mass body 11, which has a prescribed mass, is pierced by the support shaft 14 in a through-hole 11a, and one end surface of the mass body 11 bears on a flange 14a of the support shaft 14. The other end surface of the mass body 11 is integrally and removably coupled to the support shaft 14 by means of a screw 16 tightened against a washer 15.

The mass body 11 is mounted, in a manner to allow free vibration, to the first base plate 1 at the bottom end of the support shaft 14. When the mass body 11 of this emodiment of the present invention is comparatively large, a means is required by which the mass body 11 is supported on the first base plate 1 without hindering its vibration. For this reason, a supporting frame 17 is welded onto the first base plate 1, and an elastic member or membrane 19 is provided through vulcanizing bonding between the inner circumferential surface of an annular member 18 with a U-shaped cross-sectional area and the outer circumferential surface of a cup member 15a formed by bending up the outer edge of the washer 15. The annular member 18 is secured by pressing onto the end edge of the supporting frame 17. Thus, the mass body 11 is supported so that it is capable of moving in the vertical direction in relation to the first base plate 1. A ventilation hole 17a is formed in the supporting frame 17.

A diaphragm 24 and a cover 25 are secured by being pressed between the second base plate 2 and the vehicle body 10, such that a second fluid chamber 26 is formed between the second base plate 2 and the diaphragm 24. A ventilation hole 25a is formed in the cover 25. A small hole 27a is formed in the second base plate 2 which acts to adjust the fluid pressure within the first fluid chamber 4 when the first base plate 1 on the power unit side receives a static load from the power unit 7.

The action of this embodiment of the present invention is described hereinafter.

On receiving vibrational input in the prescribed frequency range from the first base plate 1 on the power unit side, the displacement X of the first base plate 1 on the power unit side and the displacement Y of the mass body 11 are in opposite phases up until the vicinity of the resonant frequency f2 in the lower frequency range, so that the pressure increase in the first fluid chamber 4 will be suppressed in the frequency range. In the higher frequency range, which exceeds the resonant frequency f2, the displacement X and Y are in the same phase.

Figure 2:
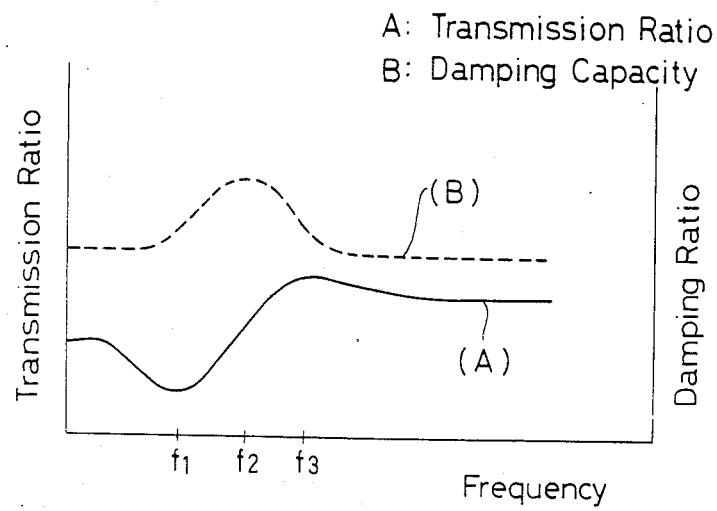
FIG. 2 is a graph which shows the transmission ratio-frequency characteristics in curve A and the damping capacity-frequency characteristics in curve B of the first embodiment of the present invention.

Accordingly, for the vibrations impressed on the first base plate 1 on the power unit side and transmitted to the second base plate 2 on the vehicle body side, the ratio of transmission will change as shown by the solid line (A) in FIG. 2, which gives the relationship between the transmission ratio and the frequency characteristics. In the lower frequency range up to frequency f1 slightly lower than the resonant frequency f2, the transmission ratio gradully falls. At the frequency f1, the minimum is reached, after which it gradually starts to rise. Passing the resonant frequency f2, a maximum is reached at a frequency f3, after which a uniform value is maintained.

Figure 3:
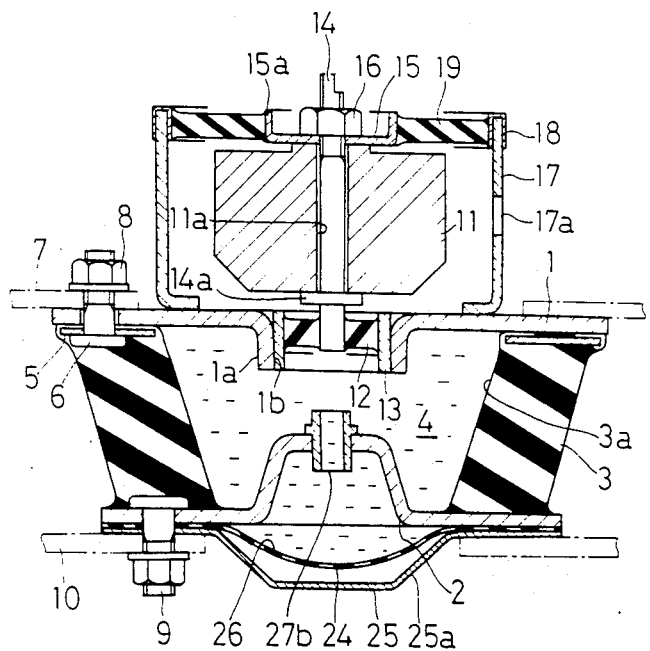
FIG. 3 is a sectional view illustrating a second embodiment of the present invention.

This kind of transmission ratio characteristics are very similar to those obtained with a conventional power unit mount assembly with one orifice. As shown in the broken line (B) in FIG. 3 (damping capacity vs. frequency characteristics), a high damping force can be obtained at the resonant frequency f2. By means of the mount assembly of this embodiment of the present invention, it is easy to obtain conformity of the frequency f1 at which the transmission force is reduced, or the frequency f2 at which the maximum value of the damping capacity is shown, to a prescribed frequency where difficulties exist with conventional mount asemblies, and the desired characteristics can be obtained.

Specifically, if the mass of the mass body 11 is m, the elastic membranes 12 and 19 have equivalent spring constants k*, the pressure receiving area of the elastic membrane 12 joined to the first fluid chamber 4 is A1, and the cross-sectional area of the internal space 3a on the mount rubber is A2, then the resonant frequency f2 is usually given by the equation $$f2 = \frac{1}{2\pi}\sqrt{\frac{k^*}{m}}.$$

In addition, the inventors of the present invention have found, by conducting numerous tests, that the resonant frequency f2 is proportional to A1/A2.

Accordingly, by reducing the pressure receiving area A1 of the elastic membrane 12, it is possible to reduce the resonant frequency f2, and the resonant frequency f2 can be made to correspond to the desired frequency (for example, the low frequency range 6 to 15 Hz, where engine shake is produced) without increasing of the mass m of the mass body 11, or without reducing the spring constant k* of the elastic membranes 12 and 19. Furthermore, an increase in the mass m of the mass body 11 exhibits a frequency of occurrence similar to that of the increased equivalent mass of the fluid in the orifice of a conventional mount assembly, causing the increase in the damping capacity. Furthermore, because the mass body 11 is freely removable, the resonant frequency f2 can be easily adjusted.

FIG. 4 illustrates a second embodiment of the present invention, wherein like members are indicated by like numbers used in the first embodiment, and an explanation of the construction is therefore omitted.

In this second embodiment of the present invention, the first base plate 1 is relatively flat comparing with the frustum in FIG. 1, and the second base plate 2 projects into the first fluid chamber 4. The diaphragm 24 and the cover 25 are secured by being pressed between the second base plate 2 and the vehicle body 10 to form a second fluid chamber 26 between the second base plate 2 and the diaphragm 24, enclosing fluid. The second base plate 2 is provided with an orifice 27b, which has a comparatively large diameter and length, and which forms a throttling fluid channel in the second base plate 2. A ventilating hole 25a is provided in the cover 25.

In this embodiment of the present invention, the fluid passing through the orifice 27b will produce a high damping force in the frequency range (for example 6 to 15 Hz) where engine shake is produced. By setting at a higher frequency range (e.g. 40 to 50 Hz) the resonant frequency f2 of the elastic membrane 12 on which the mass body 11 is mounted, it is possible to reduce the transmission of the vibrations caused by the idling of the engine to the vehicle body 10 at an intermediate range (e.g. 20 to 30 Hz), where a worsening of the transmission ratio characteristics may be caused by the orifice 27b.

It is intended, therefore, that all matter contained in the foregoing description and in the drawings shall be interpreted as illustrative only, and not as limitative of the invention.

What is claimed is:

1. A fluid-containing power unit mount assembly comprising a first upper base plate secured to a power unit and a second lower base plate secured to a vehicle body and an elastic member secured between the first and second base plates to define with the elastic member, the first upper base plate and the second lower base plate an inner space forming a first fluid chamber which encloses a fluid; wherein the first upper base plate is provided with an aperture, which aperture is blocked by a second elastic member on which is mounted a mass body.

2. The fluid-containing power unit mount assembly of claim 1, wherein the resonant frequency of the second elastic member on which the mass body is mounted is set at a low frequency of 6 to 50 Hz.

3. The fluid-containing power unit mount assembly of claim 1 wherein the first base plate is formed with a supporting frame which further supports through a third elastic member the mass body.

4. The fluid-containing power unit mount assembly of claim 1 wherein a second fluid chamber is provided on the side of the second base plate opposite the first fluid chamber, wherein the second fluid chamber is defined between the second base plate first fluid chamber and a diaphragm and communicates with the first fluid chamber through an orifice formed in the second base plate.

5. The fluid-containing power unit mount assembly of claim 1 wherein the first base plate, at its center section, projects into the first fluid chamber in the form of a frustum whereas the second base plate is flat.

6. The fluid-containing power unit assembly of claim 4, wherein the first base plate is substantially flat whereas the second base plate, at its center section, projects into the first fluid chamber in the form of a frustum.

7. A fluid-containing power unit mount assembly, comprising:
a first base plate secured to a power unit;
a second base plate secured to a vehicle body;
a first elastic member secured between the first and second base plates, said elastic member having a hollow portion forming a chamber filled with fluid and bounded by said first and second base plates;
a mass positioned adjacent said first base plate; and
means for elastically securing said mass to said first base plate in a manner to allow free vibration of said mass, said elastic securing means contacting the fluid in said chamber.

8. A fluid-containing power unit mount assembly as claimed in claim 7, wherein said elastic securing means includes:
an aperture in said first base plate, said aperture facing said fluid in said chamber;
a second elastic member filling said aperture;
a support shaft secured at a first end to said second elastic member, and at a second end to said mass;
wherein said support shaft is vibrationally isolated from said first base plate by means of said second elastic member.

9. A fluid-containing power unit mount assembly as claimed in claim 8, wherein said elastic securing means further includes a third elastic member secured at a first end to a supporting frame extending from said first base plate, and at a second end to said mass.

10. A fluid-containing power unit mount assembly as claimed in claim 9, wherein said supporting frame includes a ventilation hole.

11. A fluid-containing power unit mount assembly as claimed in claim 7, wherein said mount assembly further includes means for adjusting the fluid pressure within said fluid-filled chamber when said first base plate receives a static load from said power unit.

* * * * *